US012511432B2

(12) United States Patent
Wang et al.

(10) Patent No.: US 12,511,432 B2
(45) Date of Patent: *Dec. 30, 2025

(54) PRIVACY PRESERVING APPLICATION AND DEVICE ERROR DETECTION

(71) Applicant: Google LLC, Mountain View, CA (US)

(72) Inventors: Gang Wang, Frederick, MD (US); Marcel M. Moti Yung, New York, NY (US); David Bruce Turner, Newark, CA (US)

(73) Assignee: Google LLC, Mountain View, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 18/421,458

(22) Filed: Jan. 24, 2024

(65) Prior Publication Data

US 2024/0160779 A1 May 16, 2024

Related U.S. Application Data

(63) Continuation of application No. 17/285,547, filed as application No. PCT/US2020/032502 on May 12, 2020, now Pat. No. 11,928,237.

(30) Foreign Application Priority Data

Apr. 23, 2020 (IL) .......................................... 274165

(51) Int. Cl.
*G06F 21/62* (2013.01)
*G06F 21/44* (2013.01)
(Continued)

(52) U.S. Cl.
CPC .......... *G06F 21/6245* (2013.01); *G06F 21/44* (2013.01); *G06F 21/57* (2013.01); *H04L 9/3247* (2013.01); *H04L 9/3263* (2013.01)

(58) Field of Classification Search
CPC ...... G06F 21/6245; G06F 21/44; G06F 21/57; G06F 21/6254; G06F 21/64;
(Continued)

(56) References Cited

U.S. PATENT DOCUMENTS

| 8,850,216 B1 | 9/2014 | Mikhailov et al. |
| 2002/0128983 A1* | 9/2002 | Wrona .................. H04L 9/3263 705/71 |

(Continued)

FOREIGN PATENT DOCUMENTS

| CN | 101573936 | 11/2009 |
| EP | 1205889 | 5/2002 |

(Continued)

OTHER PUBLICATIONS

Blog.cloudflare.com [online], "Supporting the latest version of the Privacy Pass Protocol" Oct. 28, 2019, retrieved on Sep. 21, 2022, retrieved from URL <https://blog.cloudflare.com/supporting-the-latest-version-of-the-privacy-pass-protocol/>, 28 pages.

(Continued)

*Primary Examiner* — Henry Tsang
(74) *Attorney, Agent, or Firm* — Fish & Richardson P.C.

(57) ABSTRACT

Methods, systems, and apparatus, including computer programs encoded on a computer storage medium, for detecting errors in a client device and its associated applications while preserving the privacy of the user of the device. Methods can include obtaining and blinding contextual application data for an application on a device. Data regarding the application's digital certificate and device trustworthiness data are obtained and provided to a trust assessment server along with the blinded data. This server can provide indications that the device is trustworthy and the application is authentic, and can digitally sign the blinded data. The digital signature can be validated and the unblinded contextual (Continued)

application data can be obtained. If the unblinded data matches the contextual application data, the application can provide the digital signature, the indications, and the unblinded contextual application data to an error detection server, which in turn can indicate the application does not have errors.

20 Claims, 4 Drawing Sheets

(51) Int. Cl.
*G06F 21/57* (2013.01)
*H04L 9/32* (2006.01)

(58) Field of Classification Search
CPC .......... G06F 21/602; G06F 2221/2141; G06F 21/33; H04L 9/3247; H04L 9/3263; H04L 9/321; H04L 9/3268; H04L 63/0823; H04L 63/123; H04L 63/126; H04L 63/1433; H04L 9/3257
See application file for complete search history.

(56) References Cited

U.S. PATENT DOCUMENTS

| | | | |
|---|---|---|---|
| 2013/0117824 A1* | 5/2013 | Naslund | H04L 9/321 726/4 |
| 2014/0066015 A1* | 3/2014 | Aissi | H04W 4/60 455/411 |
| 2015/0089568 A1 | 3/2015 | Sprague et al. | |
| 2019/0171825 A1* | 6/2019 | Khi | H04L 9/0643 |
| 2019/0349204 A1* | 11/2019 | Enke | G06F 21/64 |
| 2019/0356649 A1 | 11/2019 | Alwen et al. | |

FOREIGN PATENT DOCUMENTS

| | | |
|---|---|---|
| GB | 2524578 | 3/2014 |
| JP | 2008-310760 | 12/2008 |
| JP | 2012-037959 | 2/2012 |
| JP | 2015-519652 | 7/2015 |
| JP | 2016-129037 | 7/2016 |
| KR | 10-2013-0129184 | 11/2013 |
| KR | 10-2016-0017551 | 2/2016 |
| KR | 10-2017-0088858 | 8/2017 |
| WO | WO 2011160683 | 12/2011 |
| WO | WO 2019233204 | 12/2019 |

OTHER PUBLICATIONS

DataTracker.ietf.org [online], "Oblivious Pseudorandom Functions (OPRFs) using Prime-Order Groups," Jul. 2019, retrieved on Apr. 16, 2021, retrieved from URL<https://datatracker.ietf.org/doc/draft-sullivan-cfrg-voprf/>, 2 pages.
Davidson et al., "Round-optimal Verifiable Oblivious Pseudorandom Functions from Ideal Lattices," IACR Cryptol. ePrint Arch., Oct. 2018, 46 pages.
Developer.Android.com [online], "SafetyNet Attestation API," Dec. 2020, retrieved on Apr. 16, 2021, retrieved from URL<https://developer.android.com/training/safetynet/attestation#use-response-server>, 2 pages.
Extended European Search Report in European Appln. No. 22183531.7, mailed on Nov. 28, 2022, 8 pages.
GitHub.com [online], "Conversion Measurement with Aggregation Explainer Introduction," Apr. 2020, retrieved on Apr. 16, 2021, retrieved from URL<https://github.com/WICG/conversion-measurement-api/blob/main/AGGREGATE.md>, 7 pages.
GitHub.com [online], "Trust Token API Explainer," Mar. 2021, retrieved on Apr. 16, 2021, retrieved from URL<https://github.com/WICG/trust-token-api>, 12 pages.
International Preliminary Report on Patentability in International Appln. No. PCT/US2020/032502, mailed on Nov. 3, 2022, 11 pages.
International Search Report and Written Opinion in International Appln. No. PCT/US2020/032502, mailed on Jan. 18, 2021, 18 pages.
Notice of Allowance in European Appln. No. 22183531.7, mailed on Jul. 12, 2023, 9 pages.
Notice of Allowance in Japanese Appln. No. 2021-521052, mailed on Aug. 1, 2022, 5 pages (with English translation).
Notice of Allowance in Japanese Appln. No. 2022-136800, mailed on Nov. 27, 2023, 5 pages (with English translation).
Notice of Allowance in Korean Appln. No. 10-2021-7008982, mailed on Nov. 25, 2022, 4 pages (with English translation).
Notice of Allowance in Korean Appln. No. 10-2023-7004161, mailed on Apr. 23, 2024, 5 pages (with English translation).
Office Action in India Appln. No. 202127011604, mailed on Dec. 7, 2022, 6 pages (with English translation).
Office Action in Chinese Appln. No. 202080005624.6, mailed on Oct. 17, 2024, 11 pages (with English translation).
Davidson et al., "Verifiable Oblivious Pseudorandom Functions (VOPRFs) in Prime-Order Groups" Network Working Group Internet-Draft, Oct. 2018, 17 pages.

* cited by examiner

PRIVACY PRESERVING APPLICATION AND DEVICE ERROR DETECTION

CROSS-REFERENCE TO RELATED APPLICATION

This application is a continuation application of, and claims priority to, U.S. patent application Ser. No. 17/285,547, filed on Apr. 15, 2021, which is a National Stage Application under 35 U.S.C. § 371 and claims the benefit of International Application No. PCT/US2020/032502, filed May 12, 2020, which claims the benefit of IL Application No. 274165, filed Apr. 23, 2020. The disclosures of the foregoing applications are hereby incorporated by reference in their entirety.

BACKGROUND

This specification generally relates to detecting errors in a client device and its associated applications while preserving the privacy of the user of the client device.

A client device can use an application (e.g., a web browser, a native application) to access a content platform (e.g., a search platform, a social media platform, or another platform that provides content). The content platform can provide digital content for display within the application launched on the client device.

In some instances, an application executing on the client device may interact with a content platform in a manner that, e.g., either deviates from the normal or expected interactions with the content platform or disrupts/compromises the operations and/or security of the content platform. Such interactions may be the result of errors in the application and/or the client device. In some instances, such errors may be caused or injected by a malicious entity, which may have compromised or inappropriately modified the application (including its software development kit ("SDK")), the underlying client device, and/or the data that is provided from the application to the content platform.

SUMMARY

In general, one innovative aspect of the subject matter described in this specification can be embodied in methods including the operations of obtaining, by an application executing on a client device, contextual application data representing a context in which content is provided and interacted with, within the application; blinding, by the application, the contextual application data to generate blinded contextual application data; obtaining data regarding a digital certificate of the application and device trustworthiness data including data that can be used in assessing trustworthiness of the client device; providing, to a trust assessment server, the blinded contextual application data, the data regarding the digital certificate, and the device trustworthiness data; receiving, the trust assessment server, a set of data including (1) a first indication specifying that the client device is trustworthy, (2) a second indication specifying that the application is authentic, and (3) a digital signature, of the trust assessment server, over a first data item; validating the digital signature over the first data item; in response to validating the digital signature over the first data item, unblinding, by the application, the first data item to obtain an unblinded first data item; confirming that the unblinded first data item matches the contextual application data; in response to confirming that the unblinded first data item matches the contextual application data, providing, to an application error detection server, the digital signature over the first data item, the first indication, the second indication, and the unblinded first data item; and receiving, from the application error detection server, a third indication specifying that the application does not have any errors. Other embodiments of this aspect include corresponding methods, apparatus, and computer programs, configured to perform the actions of the methods, encoded on computer storage devices. These and other embodiments can each optionally include one or more of the following features.

In some implementations, methods can further include determining, by the trust assessment server, that (1) the client device is trustworthy based on the device trustworthiness data and (2) the application is authentic by comparing the data regarding the digital certificate of the application with data regarding digital certificates of known authentic applications; and providing, by the trust assessment server and to the client device, the first indication specifying that the client device is trustworthy and the second indication specifying that the application is a known application.

In some implementations, the data regarding a digital certificate of the application can include a digital digest of an application package (APK) of the application; or a crypto-hash of the APK of the application.

In some implementations, obtaining data regarding a digital certificate of the application and device trustworthiness data including device data that can be used in assessing trustworthiness of the client device, can include obtaining data regarding a digital certificate of the application by a trusted application or an operating system executing on the client device; and obtaining device trustworthiness data by a device trustworthiness client application executing on the client device.

In some implementations, the first indication specifying that the client device is trustworthy can be a two-bit value, in which a first bit of the two-bit value indicates that the client device has not been inappropriately modified or altered; and a second bit of the two-bit value indicates that a profile of the client device matches a profile of a device that has previously been verified.

In some implementations, methods can further include the operations of, in response to providing, to the application error detection server, the digital signature over the first data item, the first indication, the second indication, and the contextual application data, communicating with the trust assessment server to verify the digital signature, wherein the digital signature is an IETF VOPRF digital signature and is verifiable by the trust assessment server that initially generated the digital signature.

In some implementations, methods can further include the operation of receiving, by the application error detection server and from the trust assessment server, a fourth indication specifying that the digital signature is valid.

In general, another innovative aspect of the subject matter described in this specification can be embodied in methods including the operations of generating, by an application executing on a client device, a random set of data; blinding, by the application, the random set of data to generate blinded random set of data; obtaining data regarding a digital certificate of the application and device trustworthiness data including device data that can be used in assessing trustworthiness of the client device; providing, to a trust assessment server, the blinded random set of data, the data regarding the digital certificate, and the device trustworthiness data; receiving, from the trust assessment server, a first set of data including (1) a first indication specifying that the client device is trustworthy, (2) a second indication specifying that the application is authentic, and (3) a digital signature, of the trust assessment server, over a first data item; validating the digital signature over the first data item; in response to validating the digital signature over the first data item, unblinding, by the application, the first data item to obtain an unblinded first data item; confirming that the unblinded first data item matches the random set of data; in response to confirming that the unblinded first data item matches the random set of data, obtaining, by the application, contextual application data representing a context in which content is provided and interacted with, within the application; providing, to an application error detection server, the digital signature over the first data item, the first indication, the second indication, and the contextual application data; and receiving, from the application error detection server, a third indication specifying that the application does not have any errors. Other embodiments of this aspect include corresponding methods, apparatus, and computer programs, configured to perform the actions of the methods, encoded on computer storage devices.

Particular embodiments of the subject matter described in this specification can be implemented to realize one or more of the following advantages. The techniques described in this specification can be used to identify errors in (e.g., software errors, bugs, defects, etc.)/malicious activity on a client device and/or an application executing on the client device. To identify such errors/malicious activity, some conventional techniques have evaluated contextual application data (e.g., website visited, time of visit, browser or application used to visit the website) collected from the application executing on the client device.

However, such conventional solutions are not as robust as the techniques described in this specification. This is because the techniques described in this specification augment the error/malicious activity detection based on contextual application data, with a device trustworthiness and application authenticity determination. For example, the device trustworthiness and application authenticity analysis described in this specification can determine that certain activity is being performed on a modified browser (or other applications emulating a browser) running on a rooted mobile device. As another example, the device trustworthiness and application authenticity analysis described in this specification can determine that certain activity is being performed on a modified browser that is executing in an emulator. In these examples, the techniques described herein would deem the identified client device as untrustworthy and the application (the browser in this case) as inauthentic, which in turn can strongly indicate that the application has errors (and perhaps is even compromised). As such, these techniques provide improvements over conventional systems that did not consider device trustworthiness or application authenticity.

Moreover, the innovations described in this specification also utilize privacy preserving techniques in verifying the client device and/or the application's trustworthiness/authenticity and determining whether interactions with the application indicate errors in the application. In some conventional systems, a script collects contextual application data (e.g., website visited, time of visit, browser or application used to visit the website), which can be used to identify application errors. In other conventional systems, users' historical interactions across multiple different content pages, content platforms, and applications can be aggregated to identify application errors. However, such data collection in conventional systems can also be used for user fingerprinting, i.e., to a mass data that is private to the user of the application/device and to monitor users' activities.

In contrast, the techniques described in this specification enable verifying the client device and/or the application's trustworthiness/authenticity and determining whether interactions with the application indicate errors in the application, while preventing user fingerprinting, thereby improving privacy. In some implementations, the techniques described in this specification enable such improved privacy by utilizing a bifurcated architecture in which a trust assessment server (or server instance) verifies the authenticity/trustworthiness of the device and application, while another application error detection server (or server instance) identifies errors based on the contextual application data. Such a bifurcated architecture limits the amount of user/device information being shared with entities outside of or separate from the client device. For example, the data required to perform the device trustworthiness and application authenticity assessments is only provided to the trust assessment server, and not to the application error detection server. Similarly, the data required to perform the application error detection is only provided to the application error detection server, and not to the trust assessment server. As further described in this specification, this type of information shielding between entities is enabled by the use of blind signatures.

The disclosed techniques are therefore advantageous in protecting sensitive user information (e.g., the contextual application data) and ensuring user privacy, since this information cannot be linked to the corresponding data regarding a digital certificate of the application, and device trustworthiness data by any entity outside of the client device. This is because the trust assessment server does not have access to the contextual application data, and the application error detection server does not have access to the data regarding a digital certificate of the application and the device trustworthiness data. This also prevents any collusion between the servers to try and learn information about a user (e.g., by matching the contextual application data to the data regarding a digital certificate of the application and device trustworthiness data), and therefore user information is protected during the process of identifying errors in a client device and/or the device's associated applications.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
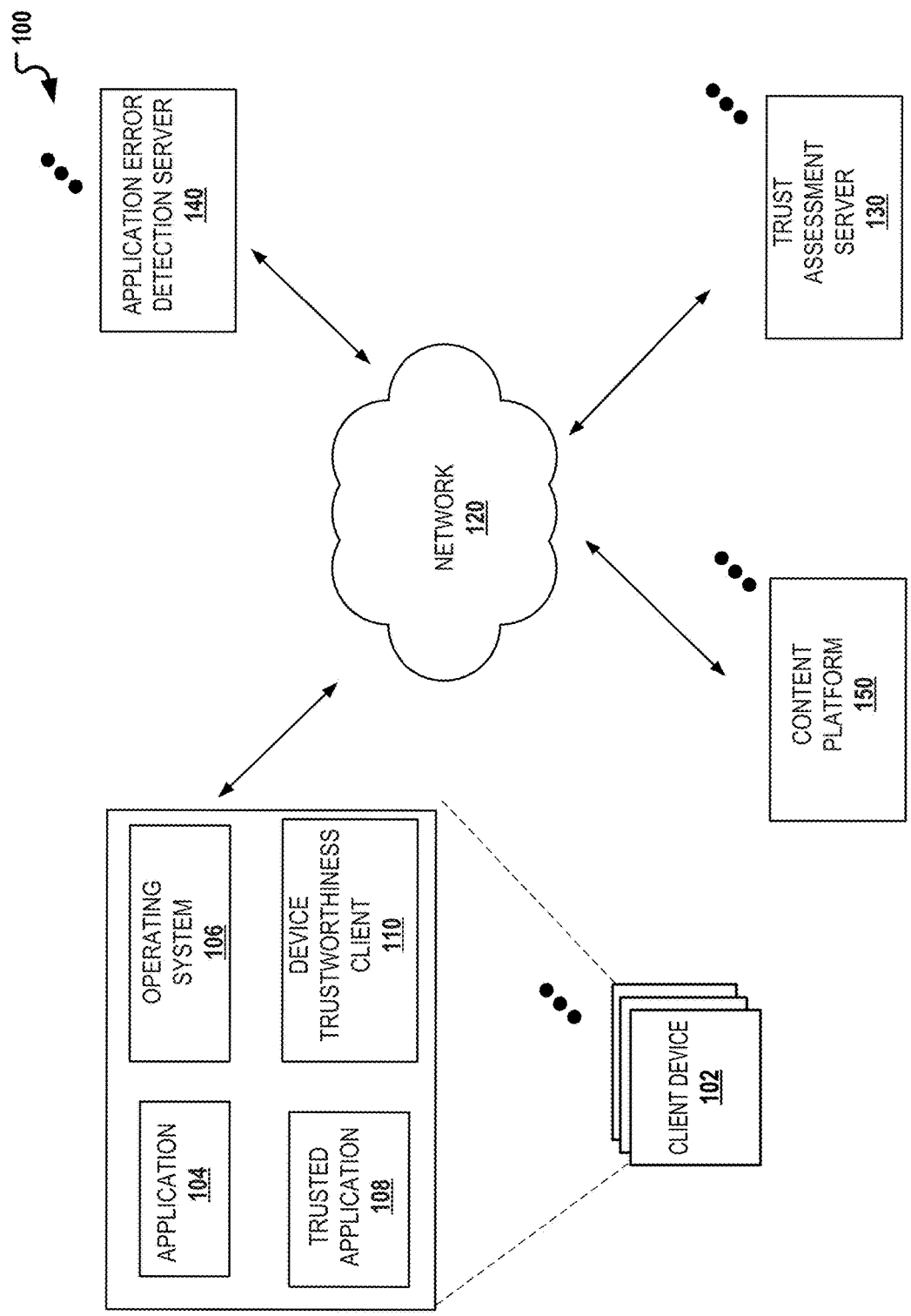
FIG. 1 is a block diagram of an example environment in which digital content is distributed to and presented on a client device.

This specification generally relates to techniques for more robust error detection (relative to conventional systems) in a client device and/or its associated applications without compromising the privacy of the user of the client device.

As described throughout this specification, the improved error detection techniques use a bifurcated architecture in which one system/server/server instance performs a device and application trustworthiness/authenticity assessment (e.g., the trust assessment server shown in FIG. 1) while a second system/server/server instance detects errors in the application and/or the device (e.g., the application error detection server shown in FIG. 1) based on contextual application data, (as further described in this specification). By using such an architecture and applying blind signatures on certain data that is provided to these systems/servers/server instances, minimal user/device information is shared with any one server/system/instance (e.g., only as much information as is necessary to perform that system/server/server instance's operations). This provides the advantage of preventing the data required for the device and application trustworthiness/authenticity assessment being matched, by an external entity (outside of the client device), to the contextual application data. This therefore prevents any external entity from learning information about a user as a result of the matching, thereby providing improved user privacy.

The operations/interactions of the application error detection server, the trust assessment server, and the client device in detecting errors in the application and/or the client device are summarized below and described in detail throughout this specification.

The client device first obtains a set of data, including (1) contextual application data, which represents a context in which content is provided and interacted with, within the application (e.g., user browsing history, current webpage/website visited, mouse movement, user interaction with the current domain, or any signal that a script can collect from the application, user interactions with content displayed in the application, etc.), (2) data regarding a digital certificate of the application (e.g., a digital digest or cryptohash of an application package (APK) of the application), and (3) device trustworthiness data, which includes data that can be used in assessing trustworthiness of the client device (e.g., type of device used, operating system of the device, etc.). The application (or the operating system/trusted application) blinds the contextual application data and sends this blinded data along with the device trustworthiness data and the data regarding the digital certificate, to the trust assessment server.

Based on the received device trustworthiness data and the data regarding the digital certificate, the trust assessment server determines whether the device is trustworthy and whether the application is authentic (i.e., the application is an official build and/or it is a known, trusted application that, e.g., has been scanned for security issues and has been deemed to not have any malware or virus (or another security issue)).

Because the contextual application data is blinded, the trust assessment server is unable to access or decipher this data (even though it receives it from the application). The trust assessment server digitally signs the blinded contextual application data and provides, to the application (or the operating system/trusted application), this digital signature along with indications specifying whether the device is trustworthy and whether the application is authentic.

Upon receiving the data from the trust assessment server, the application (or the operating system/trusted application) verifies the digital signature to ensure that the data (i.e., the blind signature) provided by the trust assessment server has not been modified or otherwise has been compromised or falsified. Once verified, the application (or the operating system/trusted application) unblinds the contextual application data and compares the unblinded contextual application data to the contextual application data that the application previously sent to the trust assessment server. If a match is found based on this comparison, the application (or the operating system/trusted application) provides the digital signature (from the trust assessment server), the unblinded contextual application data, and the indications regarding the device and application's trustworthiness/authenticity, to the application error detection server. Because only the indications regarding the device and application's trustworthiness/authenticity (and not the device trustworthiness data and the data regarding the digital certificate of the application) are provided to the application error detection server, this server is never made privy to the device trustworthiness data or the data regarding the digital certificate of the application (which further protects the user/device's privacy). Due to the blind signature scheme adopted, the trust assessment server is not privy to the contextual application data either, which further protects the user/device's privacy.

Upon receiving the data from the application (or the operating system/trusted application), the application error detection server verifies the received digital signature. Once verified, the application error detection system uses the contextual application data along with the indications regarding the device and application's trustworthiness/authenticity, to determine if there are errors in the application and/or the client device. The application error detection system provides its determination regarding the presence (or absence) of errors to a content platform and/or the client device, which in turn can determine whether to limit, restrict, or allow continued interactions between the application and the client device and/or the content platform.

These features and additional features are described below with reference to FIGS. 1-4.

FIG. 1 is a block diagram of an example environment in which digital content is distributed to and presented on a client device. The example environment 100 includes a network 120, such as a local area network (LAN), a wide area network (WAN), the Internet, or a combination thereof. The network 120 connects client devices 102, content platforms 150, application error detection servers 140, and trust assessment servers 130. The example environment 100 may include many different client devices 102, content platforms 150, application error detection servers 140, and trust assessment servers 130.

A content platform 150 is a computing platform that enables distribution of content. Example content platforms 150 include search engines, social media platforms, new platforms, data aggregator platforms, or other content sharing platforms. Each content platform 150 may be operated by a content platform service provider. The content platform 150 may publish and make available on the platform, its own content. For example, the content platform 150 may be a news platform, which publishes its own news articles. The content platform 150 may also present content provided by one or more content sources/providers. In the above example, the news platform may also present content created by different authors and provided by one or more content sources. As another example, the content platform 150 may be a data aggregator platform that does not publish any of its own content, but aggregates and presents news articles provided by different news websites (i.e., content sources/providers).

A client device 102 is an electronic device that is capable of requesting and receiving content over the network 120. Example client devices 102 include personal computers, mobile communication devices, digital assistant devices, wearable devices, smart home devices, and other devices that can send and receive data over the network 120.

A client device 102 typically includes one or more user applications (e.g., application 104), such as a web browser or a native application, to facilitate sending and receiving of content over the network 120. Examples of content presented at a client device 102 include webpages, word processing documents, portable document format (PDF) documents, images, videos, and search results pages and digital ads.

When a client device 102 accesses a content page provided by a content platform 150 within an application (e.g., application 104, which can be a browser or a native application), a script on the content page, or native code in the client application 104, requests content from one or more content sources. In response to the request for content, one or more content sources can provide content that can be provided for display within the application 104.

As summarized below and described in greater detail with reference to FIGS. 2 and 3, one or more components of the client device 102, such as the operating system 106, the trusted application 108, and the device trustworthiness client 110, can work in cooperation with the trust assessment server 130 and the application error detection server 140 to identify errors in the application 104. The structure and operations of these components is summarized below and described in greater detail with reference to FIG. 2.

The client device 102 includes an operating system 106 that is primarily responsible for managing the device hardware and software resources. The client device 102 also includes one or more non-transitory storage devices to store data temporarily or permanently based on the particular implementation, application, and/or use case.

The client device 102 includes a trusted application 108. As used in this specification, the trusted application 108 is an application that operates within a secured environment on the client device 102 and performs certain core device services (similar to device services performed by the privileged/kernel code within the operating system). In some implementations, the trusted application 108 can be part of the operating system 106 or a web browser, or it can be implemented and/or published by the operating system vendor (or the web browser vendor). In some implementations, the operating system 106 can be an open source operating system, while the trusted application 108 operates as a private/closed-source operating system. In some implementations, the trusted application 108 can be excluded or removed from the client 102, in which case the operations of the trusted application 108 can be performed by the operating system 106.

The trusted application 108 (or the operating system 106) can collect the application package (APK) certificate of the application (e.g., a web browser) and calculate its digital digest (which is a unique identifier of the certificate that is generally generated by applying a hash function to one or more fields of the certificate). This digital digest can be used in evaluating whether the application is authentic/trustworthy. Similarly, the trusted application 108 can calculate the cryptohash of the application package (APK). The APK cryptohash result can be used in evaluating whether the application is authentic/trustworthy.

The client device 102 includes a device trustworthiness client 110. When invoked by the operating system 106 and/or the trusted application 108, the device trustworthiness client 110 collects signals, alone or in cooperation with the operating system 106, from the client device 102's environment. Examples of the signals collected by the device trustworthiness client 110 include, but not limited to, the type of device, the model number of the device, evidence whether the device has been rooted and/or jailbroken, the operating system running on the device, when the device was last updated, etc. These signals, which are collectively referred to as device trustworthiness data, can be used to determine a trustworthiness of the client device 102 (as further described with reference to FIGS. 2 and 3).

The environment 100 further includes a trust assessment server 130, which uses data provided by the client device 102 in determining the trustworthiness of the client device 102 and/or the authenticity of the application 104 (as further described with reference to FIGS. 2 and 3).

The environment 100 also includes an application error detection server 140, which detects errors in the application 104. In some implementations, the application error detection server 140 and the trust assessment server 130 can be separate and unrelated servers. In other implementations, these servers can be separate instances running on a single server or system associated with a single entity. As described with reference to FIGS. 2 and 3, the application error detection server 140 detects errors in the application based on the contextual application data received from the client device 102 and the trustworthiness determination(s)/indication(s) provided by/received from the trust assessment server 130. As used in this specification, contextual application data includes data that represents a context in which content is provided and interacted with, within the application. Example contextual application data items include, but are not limited to, name of website being accessed in the application, the time when the website was accessed, the types of user interactions with the client device (e.g., touch on device screen, mouse click, swipe, scroll, keyboard input, etc.) during execution of the application, browsing history, browser plugin or fonts installed, and the time spent viewing portions of the content page provided within the application. Such contextual application data may be collected by a script when the application 104 (or native code executing in the application) is used to access a content platform 150. In some implementations, the script provides this data to the application 104 as an opaque byte array (or as another data structure that prevents modification of this data structure by the application 104).

If, based on the data received from the application 104, the application error detection server 140 detects an error in the application 104 and/or the client device 102, it can communicate that an error was detected to the content platform 150, which in turn can limit or prevent interactions and any further actions from the application with the content platform 150. Additionally, or alternatively, the application error detection server 140 can communicate that an error was detected to the operating system 106 and/or the trusted application 108, which in turn can limit or prevent interactions from the application with the content platform 150.

The operation of the above-described components in detecting errors in the application 104 and/or the client device 102, are further described below with reference to FIG. 2.

Figure 2:
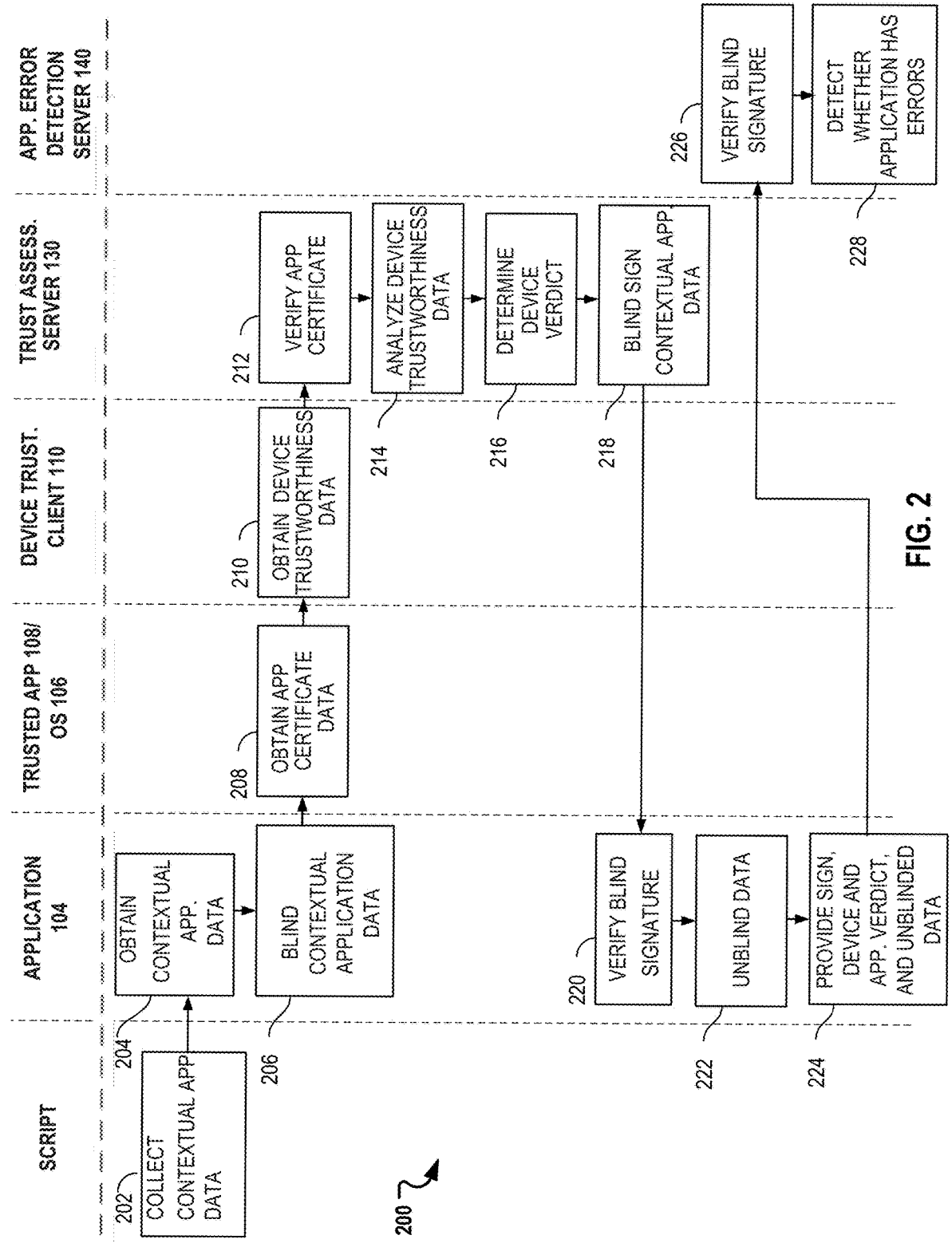
FIG. 2 is a swim lane diagram illustrating example operations of and interactions between various entities referenced in FIG. 1, in detecting errors in an application executing on a client device.

FIG. 2 is a swim lane diagram illustrating example operations of and interactions between the various entities/components referenced in FIG. 1, in detecting errors in the application 104 and/or the client device 102. Operations of the process 200 are described below for illustration purposes only. Operations of the process 200 can be performed by any appropriate device or system, e.g., any appropriate data processing apparatus. Operations of the process 200 can also be implemented as instructions stored on a non-transitory computer readable medium/storage device. Execution of the instructions causes one or more data processing apparatus to perform operations of the process 200.

A script on a content page provided within the application 104 collects contextual application data (at 202). In some implementations, when an application 104 (e.g., a web browser) is used to access a content page provided by a content platform 150 via an application 104 (executing on the client device 102), a script on the content page executes and collects contextual application data (e.g., by calling the application 104's application programming interface (API)). The contextual application data need not be limited to the current context within which the content is presented within the application; it could also include prior contexts within which the content is presented within the application (e.g., application usage history). The script can package the collected contextual application data into an opaque byte array (or another appropriate data structure that prevents modification of the data in the array by an entity that receives this data).

The application 104 obtains the contextual application data (at 204). In some implementations, the script provides (without any prompting or in response to a request for the contextual application data from the application 104) to the application 104. Thus, the application 104 obtains from the script, the contextual application data.

The application 104 blinds the contextual application data to generate blinded contextual application data (at 206). In some implementations, the application 104 can use the IETF VOPRF standard to blind the packaged contextual application data (e.g., the opaque byte array) to generate the blinded contextual application data. In other implementations, other known standards/techniques for blinding data structures can be used to generate the blinded contextual application data. In some implementations, the application 104 can provide the blinded contextual application data to the trusted application 108 or the operating system 106 (either without any prompt or in response to a request for such data from the trusted application 108 or the operating system 106). In other implementations, the application 104 can provide the blinded contextual application data to the device trustworthiness client 110 (either without any prompt or in response to a request for such data from the device trustworthiness client 110). In some implementations, the operating system 106 or the trusted application 108 can receive the contextual application data from the application and then blind this data.

The trusted application 108 obtains data regarding the digital certificate of the application (at 208). In some implementations, the trusted application 108 can collect the application 104's digital certificate (e.g., the application package (APK) certificate) and computes the certificate's digital digest or generate the APK cryptohash (or another appropriate unique identifier of the certificate). The computed digital digest, APK cryptohash or another appropriate unique identifier of the certificate constitutes the data regarding the digital certificate of the application 104. The trusted application 108 can also obtain the name of the installer package for the digital certificate, which informs how the application 104 was installed on the device (e.g., whether it was side-loaded). In some implementations, instead of the trusted application 108, the operating system 106 can obtain the data regarding the digital certificate of the application. In some implementations, the trusted application 108 (or the operating system 106) provides the blinded contextual data and the data regarding the digital certificate to the device trustworthiness client (either without any prompt or in response to a request for such data from the application 104).

The device trustworthiness client 110 obtains device trustworthiness data (at 210), as described with reference to FIG. 1. Alternatively, instead of the device trustworthiness client 110, the operating system 106 can obtain the device trustworthiness data. In some implementations, the device trustworthiness client 110 provides the device trustworthiness data to the trusted application 108 or the operating system 106 (either without any prompt or in response to a request for such data from the trusted application 108 or the operating system 106).

The operations 206 to 210 are shown in FIG. 2 as being performed in sequential order. Although these operations can be performed in such sequence in some implementations, they can also be performed in a different sequence in other implementations. Alternatively, these operations can also be performed in parallel.

In some implementations, the operating system 106, the trusted application 108, or the device trustworthiness client 110 packages the blinded contextual application data, the data regarding the digital certificate, and the device trustworthiness data, and provides this packaged data to the trust assessment server 130. Alternatively, each of the application 104, the trusted application 108/operating system 106, and the device trustworthiness client 110, can separately provide the blinded contextual application data, the data regarding the digital certificate, and the device trustworthiness data, respectively, to the trust assessment server 130.

Based on the received data (i.e., the blinded contextual application data, the data regarding the digital certificate, and the device trustworthiness data), the trust assessment server 130 performs operations 212 to 218, as further described below. The trust assessment server 130 can perform these operations sequentially (although they need not be performed in the order described below) or these operations can be performed in parallel. Notably, because the contextual application data is blinded, the trust assessment server 130 is unable to decipher it or link it back to any particular user and its activity within the application 104. Accordingly, such blinding preserves user privacy with respect to the interactions with the trust assessment server 130.

The trust assessment server 130 verifies the data regarding the digital certificate (e.g., APK hash or digital digest) of the application 104 (at 212). The trust assessment server 130 includes a trusted certificates database (or another appropriate data structure, such as a lookup table) that stores data about authentic or officially released applications. In some implementations, the trusted certificates database includes a mapping between application digital certificates (e.g., APK certificates) and the corresponding APK digital digests or APK cryptohashes (or appropriate unique identifiers for digital certificates).

The trust assessment server 130 determines whether the application 104 is authentic by comparing the data regarding the digital certificate (e.g., APK hash or digital digest) of the application with data regarding digital certificates of known, authentic applications stored. In some implementations, the trust assessment server 130 compares/looks up the digital digest or APK cryptohash (or another appropriate unique identifier for the digital certificate) of application 104's digital certificate (that it received from the application 104) with digital digests/APK cryptohashes (or another appropriate unique identifiers for the digital certificates) stored in the trusted certificates database. If a match is found based on this comparison, then the trust assessment server 130 determines that the application 104 is authentic (i.e., it is an official build of the application and/or is a known, trusted application). If, however, a match is not found based on the comparison, the trust assessment server 130 determines that the application 104 is not authentic (i.e., it is not an official build of the application and/or is not a known, trusted application). In some implementations, the trust assessment server 130 can use a one-bit value to indicate whether the application 104 is authentic or not (e.g., 1 if the application 104 is authentic; 0 if the application 104 is not authentic).

The trust assessment server 130 determines a device trustworthiness verdict based on the device trustworthiness data (at 214 and 216). In some implementations, the trust assessment server 130 can include a rules-based engine that analyzes the device trustworthiness data using a set of rules to determine whether the client device 102 is trustworthy. Alternatively, the trust assessment server 130 can include a machine learning model (a supervised or unsupervised machine learning model, or another appropriate statistical model) that accepts the device trustworthiness data for the client device 102 and outputs the client device 102's trustworthiness. In some implementations, the machine learning model can be a supervised model that is trained using training data that includes device trustworthiness data for multiple devices and the known, corresponding device trustworthiness for each of the multiple devices.

In some implementations, the device trustworthiness verdict (output by the rules-based engine, model, or other appropriate apparatus) can be a two-bit value. The first bit of the two-bit value indicates whether the client device has been inappropriately modified or altered (e.g., 1 means the client device has not been modified/altered, while 0 means the client device been modified/altered). The second bit of the two-bit value indicates that a profile of the client device matches a profile of a device that has previously been verified (e.g., 1 means the client device is known, while 2 means that the client device is unknown). Alternatively, the device trustworthiness verdict may simply be a one-bit value that provides an indication as to whether the client device is trustworthy. A person of skill in the art would understand that additional information about the device's determined trustworthiness can be encoded using additional bits.

The trust assessment server 130 blind signs the contextual application data provided by the application 104 (at 218). In some implementations, the trust assessment server 130 blind signs the contextual application data provided by the application 104 using the IETF VOPRF standard (or another appropriate blind signing standard or technique).

In some implementations, the trust assessment server 130 can indicate that a client device is trustworthy and/or the application is authentic by signing the blinded contextual application data. Conversely, the trust assessment server can indicate that a device is not trustworthy or the application is not authentic, by simply not signing the blinded contextual application data. Such an implementation obviates the need to provide additional data bits that encode the information of the device's trustworthiness and/or the application 104's authenticity, as determined by the trust assessment server 130. This is because the presence of a digital signature over the blinded contextual data alone indicates the device's trustworthiness and the application 104's authenticity. Alternatively, the additional bits can still be used to provide additional fine grain detail about the device's trustworthiness and the application 104's authenticity.

For illustration purposes, the following description of FIG. 2 assumes that the trust assessment server 130 blind signs the contextual application data regardless of the device trustworthiness verdict and separately provides one or more bits that indicate the client device 102's trustworthiness and/or the application 104's authenticity.

The trust assessment server 130 provides to the application 104—and the application 104 receives from the trust assessment server 130—the blind signed contextual application data along with an indication (a first indication) specifying whether the client device is trustworthy and another indication (a second indication) specifying whether the application is a known, trusted application (or in other words, if the application is authentic). In some implementations, the trust assessment server 130 provides this data together in an array (or another appropriate data structure), with one position of the array storing the blind signed contextual application data, another position of the array storing the indication specifying whether the client device is trustworthy, and another position of the array storing the indication specifying whether the application is a known, trusted application. In some implementations, the trust assessment server 130 blind signs contextual application data using different signing keys, based on different levels of trustworthiness of the device and/or authenticity of the application. In such implementations, the trust Assessment Server 130 delivers the first and second indications by creating the digital signature in such a way that the signature is validated by one of a few possible keys. For example, if both the first and second have two possibilities each, there are four possible combinations for the first and second indications. In such a case, the trust assessment server 130 can generate signature to be validated using one of 4 possible keys.

Upon receiving the data from the trust assessment server 130, the application 104 verifies the blind signature (at 220). If the application 104 determines that the blind signature is not a valid signature that was signed by the trust assessment server 130, the application 104 determines that the data received from the trust assessment server has been compromised and is thus, unreliable. In this case, the error detection processing ceases. In this case, the application error detection server 140 determines that the application 104 and/or the client device 102 has errors. On the other hand, if the application 104 determines that the blind signature is a valid signature that was signed by the trust assessment server 130, the application 104 unblinds the data (at 222).

If the application 104 determines that the unblinded contextual application data (which is also referred to as the first data item) does not match the contextual application data that was previously provided to the trust assessment server 130, the application 104 determines that the data received from the trust assessment server 130 has errors or has otherwise been compromised. In this case, the error detection processing of process 200 ceases. On the other hand, if the application 104 determines that the unblinded contextual application data matches the contextual application data that was previously provided to the trust assessment server 130, the processing advances to operation 224 (which is described below).

The application 104 provides, to an application error detection server 140, the digital signature over the first data item, the first indication, the second indication, and the unblinded first data item at operation 222 (at 224). In providing this data, the application 104 requests that the application error detection server 140 detect errors within the application 104 and/or the client device 102. Notably, by only providing the first and second indications, the application error detection server 140 does not receive any device trustworthiness data that was previously provided to the trust assessment server 130, thus preserving the privacy over the device trustworthiness data in the interactions with the application error detection server 130. Instead, the application error detection server 130 is only provided minimal device and application trustworthiness/authenticity information in the form of the first and second indications. Since the first and second indications do not provide any information unique to the device or application, the application error detection server is unable to learn any specific details relating to the application or client device beyond these indications. This means that, even if the application error detection server and trust assessment server were to collude in an attempt to learn information about a user, this would not be possible, since the servers would be unable to match the contextual application data (known to the error detection server) to the data regarding a digital certificate of the application and device trustworthiness data (known to the trust assessment server) for any given user.

In implementations in which the trusted application 108 or the operating system 106 blinds the contextual application data, the trust assessment server 130 provides to the trusted application 108/operating system 106 the blind signed contextual application data along with an indication (a first indication) specifying whether the client device is trustworthy and another indication (a second indication) specifying whether the application is a known, trusted application (or in other words, if the application is authentic). In such implementations, the trusted application 108/operating system 106 verifies the blind signature, unblinds the blinded data, and compares the unblinded data to the contextual application data. In such implementations, the trusted application 108/operating system 106 provides, to an application error detection server 140, the digital signature over the first data item, the first indication, the second indication, and the unblinded first data item at operation 222.

Upon receiving the data from the application 104 (or the trusted application 108/operating system 106), the application error detection server 140 verifies the blind signature (at 226). In implementations where the IETF VOPRF blind signature standard is used, the application error detection server 140 interacts with the trust assessment server 130 to verify the signature. This is because the VOPRF blind signature is not publicly verifiable. In such implementations, the application error detection server 140 communicates with the trust assessment server 130 to verify the blind signature. If the trust assessment server 130 determines that the signature is valid, it provides an indication specifying that the digital signature is valid. On the other hand, if the trust assessment server 130 determines that the signature is not valid, it provides an indication specifying that the digital signature is invalid. In some implementations, instead of the VOPRF standard, a publicly verifiable digital signature algorithm can be used, in which case the application error detection server 140 can itself verify whether the digital signature is valid (without have to reach out to the trust assessment server 130—i.e., the entity that generated the digital signature).

If the application error detection server 140 determines that the blind signature is not a valid signature that was signed by the trust assessment server 130, the application error detection server 140 determines that the data received from the application 104 has been compromised and is thus, unreliable. In this case, the application error detection server 140 determines that the application 104 and/or the client device 102 has errors. On the other hand, if the application error detection server 140 determines that the blind signature is a valid signature that was signed by the trust assessment server 130, the processing continues to operation 228 (as described below).

The application error detection server 140 determines whether the application 104 has any errors based on the first indication, the second indication, and the contextual application data (at 228). In some implementations, the application error assessment server 140 can include a rules-based engine that processes the data received from the application 104 using a set of rules to determine whether any errors are present in the application 104. Alternatively, the application error assessment server 140 can include a machine learning model (e.g., a supervised or unsupervised machine learning model, or another appropriate statistical model) that accepts the data received from the application 104 at operation 224 and outputs an indication (i.e., a third indication) specifying whether the application has any errors. In some implementations, the machine learning model can be a supervised model that is trained using training data that includes a first indication, a second indication, and contextual application data for each of multiple devices and the known, corresponding indication specifying whether errors are present in the application.

In any of the implementations described in the preceding paragraph, data regarding the client device 102's trustworthiness and the application 104's authenticity can factor into the ultimate determination of the presence of errors in the application 104 and/or the client device 102. For example, if the first and second indications specify that the client device 102 is trustworthy and the application 104 is authentic, respectively, then the application error detection server 140 can reduce the likelihood of errors being present in the application 104. As another example, if the first and second indication specify that the client device 102 is not trustworthy and the application 104 is not authentic, respectively, then the application error detection server 140 can increase the likelihood of errors being present in the application 104. As a result, the application error detection server 140's error detection is more robust than conventional techniques that do not factor in device trustworthiness and application authenticity in the application error determinations.

In summary, relative to conventional systems, the above described operations of and interactions between the various components of FIG. 1, provide a more robust indication of the presence of errors in applications while preserving the privacy of the user (by exposing minimal information to the application error detection server 140 and the trust assessment server 130, thus minimizing or possibly even eliminating any user fingerprinting).

Figure 3:
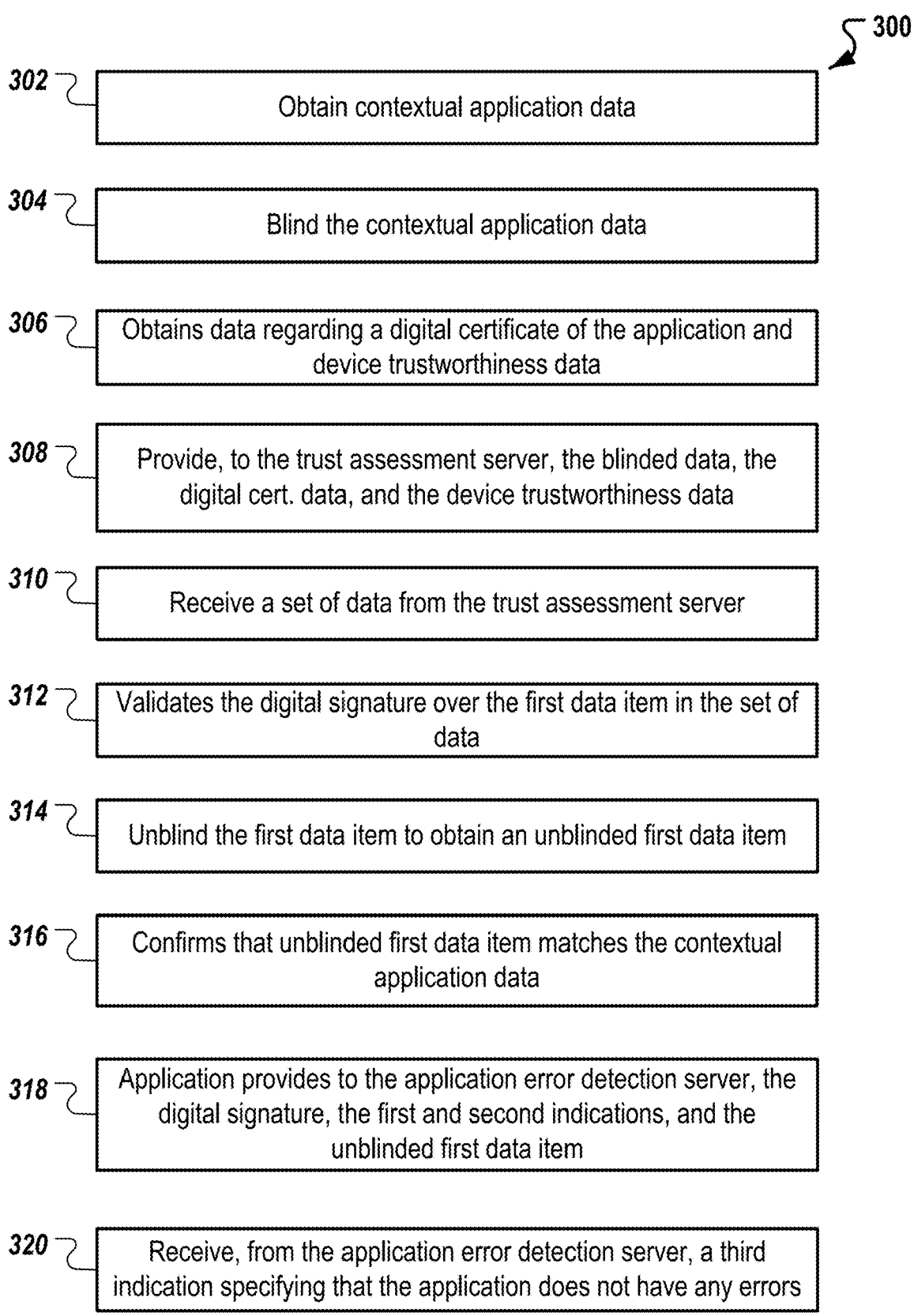
FIG. 3 is a flow diagram of an example process for detecting errors in an application executing on a client device.

FIG. 3 is a flow diagram of an example process 300 for detecting errors in an application 104 executing on a client device 102. Operations of process 300 are described below as being performed by the components of the system described and depicted in FIG. 1. Operations of the process 300 are described below for illustration purposes only. Operations of the process 300 can be performed by any appropriate device or system, e.g., any appropriate data processing apparatus. Operations of the process 300 can also be implemented as instructions stored on a non-transitory computer readable medium. Execution of the instructions causes one or more data processing apparatus to perform operations of the process 300.

The application 104 (executing on a client device 102) obtains contextual application data (at 302). As described with reference to FIGS. 1 and 2, when the application 104 is used to access a content page provided by a content platform 150, a script executes and collects contextual application data, which represents a context in which content is provided and interacted with, within the application.

The application 104 blinds the contextual application data to generate blinded contextual application data (at 304). As described with reference to FIGS. 1 and 2, the application 104 blinds the contextual application data (which can be packaged as an opaque byte array) in accordance with the IETF VOPRF standard (or another appropriate standard or blind signing technique) to generate blinded contextual application data.

The operating system 106 or trusted application 108 on client device 102 obtains data regarding a digital certificate of the application and device trustworthiness data (at 306). As described with reference to FIGS. 1 and 2, the trusted application 108 (or the operating system 106) of the client device 102 obtains the data regarding a digital certificate of the application 104, which can include the application's APK certificate, the digital digest, APK cryptohash (or another appropriate unique identifier) corresponding to the APK certificate or APK binary itself, and the installer package name of the certificate. As also described with reference to FIGS. 1 and 2, the device trustworthiness client 110 (or the operating system 106) of the client device 102 obtains the device trustworthiness data, which includes data that can be used in assessing trustworthiness of the client device (e.g., type of device, operating system installed on the device, etc.).

The trust assessment server 130 is provided the blinded contextual application data, the data regarding the digital certificate (e.g., APK hash), and the device trustworthiness data (at 308). As described with reference to FIGS. 1 and 2, the trusted application 108, the device trustworthiness client 110, or the operating system 106 packages the data regarding the digital certificate (or APK hash), along with the device trustworthiness data and the blinded contextual application data (that is generated at operation 304) and provides this data to the trust assessment server 130.

The application 104 receives from the trust assessment server 130 a set of data (at 310). As described with reference to FIGS. 1 and 2, the trust assessment server 130 uses the data regarding the digital certificate (e.g., APK digest or APK hash), and the device trustworthiness data (which it received at operation 308) to determine whether the client device 102 is trustworthy and whether the application is a known, trusted application. In addition, the trust assessment server 130 also digitally signs a first data item, which can be the blinded contextual application data (as also described with reference to FIGS. 1 and 2). The trust assessment server 130 provides to the application 104—and the application 104 receives from the trust assessment server 130—a set of data including (1) a first indication specifying that the client device is trustworthy, (2) a second indication specifying that the application is a known, trusted application, and (3) the digital signature of the trust assessment server over the first data item (as further described with reference to FIGS. 1 and 2).

The application 104 validates the digital signature over the first data item in the set of data (at 312). As described with reference to FIGS. 1 and 2, the application 104 verifies that the digital signature over the first data item is a valid signature of the trust assessment server 130.

In response to validating the digital signature over the first data item, the application unblinds the first data item to obtain an unblinded first data item (at 314). In some implementations, the application 104 unblinds the first data item included in the set of data (that was received from the trust assessment server 130 at operation 310).

The application 104 confirms that the unblinded first data item matches the contextual application data obtained by the application at operation 302 (at 316). As described above with reference to FIG. 2, the application 104 compares the unblinded first data item with the contextual application data obtained at operation 302. Upon finding a match, the application 104 confirms that the unblinded first data item is in fact the contextual application data that it previously sent to the trust assessment server 130.

In response to confirming that the unblinded first data item matches the contextual application data, the application provides to the application error detection server 140, the digital signature over the first data item, the first indication, the second indication, and the unblinded first data item (at 318).

The application 104 receives, from the application error detection server 140, a third indication specifying that the application does not have any errors (at 320). As described with reference to FIGS. 1 and 2, the application error detection server 140 uses the data it receives from the application 104 at operation 318 to determine whether the application 104 and/or the client device 102 has any errors. If the application error detection server 140 determines that the application 104 and/or the client device 102 has errors, it provides to the application 104 (and the application 104 receives) an indication specifying that the application (and/or the client device) has errors. On the other hand, if the application error detection server 140 determines that the application does not have errors, it provides to the application 104 (and the application 104 receives) an indication specifying that the application (and/or the client device 102) does not have errors.

In some alternative implementations, the operations of FIG. 3 can be modified to reduce some potential latency, by not sending the blinded contextual application data to the trust assessment server. Such implementations have the same operations as described with reference to FIG. 3, with the exception of a few operational differences, which are described below. For brevity, only the operational differences are described below in the description of these alternative implementations; however, it is noted that the remaining operations of FIG. 3 and their respective descriptions are used in these implementations (and for avoidance of any doubt, those operations are incorporated herein by reference).

In such alternative implementations, the application 104 still obtains the contextual application data, but it does not blind this data. Instead, the application 104 generates a random set of data (e.g., nonces) and blinds this random set of data to generate a blinded random set of data (which replaces operation 304 in FIG. 3's description above). This blinded random set of data is provided to the trust assessment server 130 (instead of providing the blinded contextual application data, as described in operation 306). Moreover, the trust assessment server 130 generates a digital signature over the blinded random set of data (instead of generating a digital signature over the blinded contextual application data, as described with reference to operation 310 in FIG. 3's description above). The application 104 unblinds this blinded data to confirm that it is the same as the random set of data that it had previously generated. Upon confirming this, the application provides the contextual application data along with the digital signature, the first indication, and the second indication (as in operation 318 in FIG. 3), all of which are used by the application error detection server 140 to determine whether the application 104 (and/or the client device 102) has any errors (as in operation 320 in FIG. 3).

Figure 4:
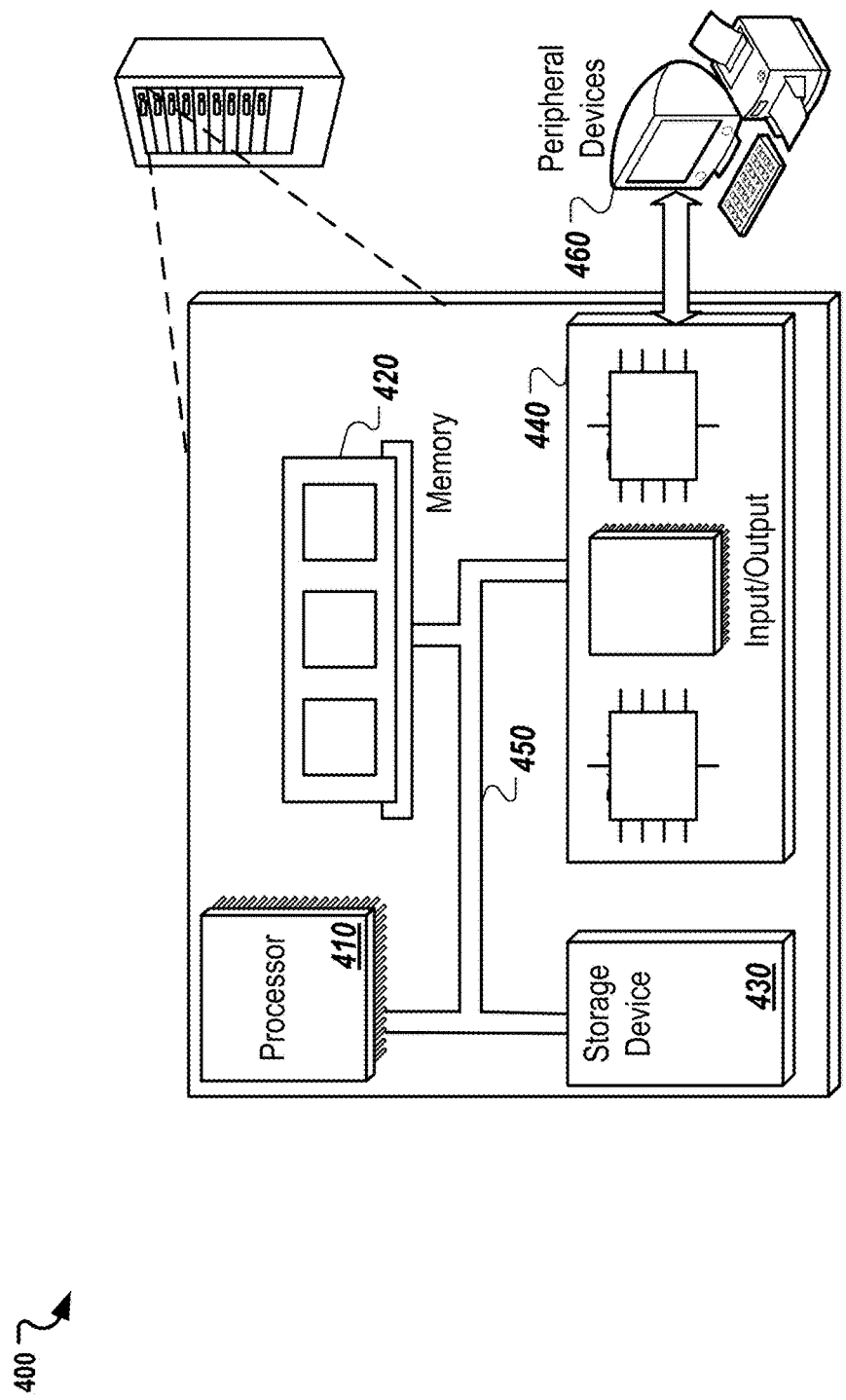
FIG. 4 is a block diagram of an example computer system that can be used to perform operations described.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device 440 can include driver devices configured to receive input data and send output data to peripheral devices 460, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   providing, to a trust assessment server, data regarding a digital certificate of an application executing on a client device, contextual application data representing a context in which content is provided and interacted with, within the application, and device trustworthiness data representing data for assessing trustworthiness of the client device;
   receiving, from the trust assessment server, a set of data including (1) a first indication specifying that the client device is trustworthy, (2) a second indication specifying that the application is authentic, and (3) a digital signature, of the trust assessment server, over a first data item;
   validating the digital signature over the first data item;
   in response to validating the digital signature over the first data item, confirming that the first data item matches the contextual application data;
   providing, to an application error detection server, the digital signature over the first data item, the first indication, the second indication, and the first data item; and
   receiving, from the application error detection server, a third indication specifying that the application does not have any errors.

2. The computer-implemented method of claim 1,
   the method further comprising blinding, by the application, the contextual application data to generate blinded contextual application data; and
   wherein providing the contextual application data to the trust assessment server, comprises providing the blinded contextual application data to the trust assessment server.

3. The computer-implemented method of claim 1, further comprising:
determining, by the trust assessment server, that (1) the client device is trustworthy based on the device trustworthiness data and (2) the application is authentic by comparing the data regarding the digital certificate of the application with data regarding digital certificates of known authentic applications; and
providing, by the trust assessment server and to the client device, the first indication specifying that the client device is trustworthy and the second indication specifying that the application is a known application.

4. The computer-implemented method of claim 1, wherein in response to validating the digital signature over the first data item, confirming that the first data item matches the contextual application data, comprises:
unblinding, by the application, the first data item to obtain an unblinded first data item; and
confirming that the unblinded first date item matches the contextual application data.

5. The computer-implemented method of claim 1, wherein the data regarding the digital certificate of the application includes:
a digital digest of an application package (APK) of the application; or
a cryptohash of the APK of the application.

6. The computer-implemented method of claim 1, wherein the first indication specifying that the client device is trustworthy is a two-bit value, wherein:
a first bit of the two-bit value indicates that the client device has not been modified or altered; and
a second bit of the two-bit value indicates that a profile of the client device matches a profile of a device that has previously been verified.

7. The computer-implemented method of claim 1, further comprising:
in response to providing, to the application error detection server, the digital signature over the first data item, the first indication, the second indication, and the contextual application data, communicating with the trust assessment server to verify the digital signature, wherein the digital signature is an IETF VOPRF digital signature and is verifiable by the trust assessment server that initially generated the digital signature; and
receiving, by the application error detection server and from the trust assessment server, a fourth indication specifying that the digital signature is valid.

8. A system, comprising:
one or more memory devices storing instructions; and
one or more data processing apparatus that are configured to interact with the one or more memory devices, and upon execution of the instructions, perform operations comprising:
providing, to a trust assessment server, data regarding a digital certificate of an application executing on a client device, contextual application data representing a context in which content is provided and interacted with, within the application, and device trustworthiness data representing data for assessing trustworthiness of the client device;
receiving, from the trust assessment server, a set of data including (1) a first indication specifying that the client device is trustworthy, (2) a second indication specifying that the application is authentic, and (3) a digital signature, of the trust assessment server, over a first data item;
validating the digital signature over the first data item;
in response to validating the digital signature over the first data item, confirming that the first data item matches the contextual application data;
providing, to an application error detection server, the digital signature over the first data item, the first indication, the second indication, and the first data item; and
receiving, from the application error detection server, a third indication specifying that the application does not have any errors.

9. The system of claim 8, wherein execution of the instructions causes performance of operations comprising:
blinding, by the application, the contextual application data to generate blinded contextual application data; and
herein providing the contextual application data to the trust assessment server, comprises providing the blinded contextual application data to the trust assessment server.

10. The system of claim 8, wherein execution of the instructions causes performance of operations comprising:
determining, by the trust assessment server, that (1) the client device is trustworthy based on the device trustworthiness data and (2) the application is authentic by comparing the data regarding the digital certificate of the application with data regarding digital certificates of known authentic applications; and
providing, by the trust assessment server and to the client device, the first indication specifying that the client device is trustworthy and the second indication specifying that the application is a known application.

11. The system of claim 8, wherein in response to validating the digital signature over the first data item, confirming that the first data item matches the contextual application data, comprises:
unblinding, by the application, the first data item to obtain an unblinded first data item; and
confirming that the unblinded first date item matches the contextual application data.

12. The system of claim 8, wherein the data regarding the digital certificate of the application includes:
a digital digest of an application package (APK) of the application; or
a cryptohash of the APK of the application.

13. The system of claim 8, wherein the first indication specifying that the client device is trustworthy is a two-bit value, wherein:
a first bit of the two-bit value indicates that the client device has not been modified or altered; and
a second bit of the two-bit value indicates that a profile of the client device matches a profile of a device that has previously been verified.

14. The system of claim 8, wherein execution of the instructions causes performance of operations comprising:
in response to providing, to the application error detection server, the digital signature over the first data item, the first indication, the second indication, and the contextual application data, communicating with the trust assessment server to verify the digital signature, wherein the digital signature is an IETF VOPRF digital signature and is verifiable by the trust assessment server that initially generated the digital signature; and
receiving, by the application error detection server and from the trust assessment server, a fourth indication specifying that the digital signature is valid.

15. A non-transitory computer readable medium storing instructions that, upon execution by one or more data processing apparatus, cause performance of operations comprising:
- providing, to a trust assessment server, data regarding a digital certificate of an application executing on a client device, contextual application data representing a context in which content is provided and interacted with, within the application, and device trustworthiness data representing data for assessing trustworthiness of the client device;
- receiving, from the trust assessment server, a set of data including (1) a first indication specifying that the client device is trustworthy, (2) a second indication specifying that the application is authentic, and (3) a digital signature, of the trust assessment server, over a first data item;
- validating the digital signature over the first data item;
- in response to validating the digital signature over the first data item, confirming that the first data item matches the contextual application data;
- providing, to an application error detection server, the digital signature over the first data item, the first indication, the second indication, and the first data item; and
- receiving, from the application error detection server, a third indication specifying that the application does not have any errors.

16. The non-transitory computer readable medium of claim 15, wherein execution of the instructions causes performance of operations comprising:
- blinding, by the application, the contextual application data to generate blinded contextual application data; and
- wherein providing the contextual application data to the trust assessment server, comprises providing the blinded contextual application data to the trust assessment server.

17. The non-transitory computer readable medium of claim 15, wherein execution of the instructions causes performance of operations comprising:
- determining, by the trust assessment server, that (1) the client device is trustworthy based on the device trustworthiness data and (2) the application is authentic by comparing the data regarding the digital certificate of the application with data regarding digital certificates of known authentic applications; and
- providing, by the trust assessment server and to the client device, the first indication specifying that the client device is trustworthy and the second indication specifying that the application is a known application.

18. The non-transitory computer readable medium of claim 15, wherein in response to validating the digital signature over the first data item, confirming that the first data item matches the contextual application data, comprises:
- unblinding, by the application, the first data item to obtain an unblinded first data item; and
- confirming that the unblinded first date item matches the contextual application data.

19. The non-transitory computer readable medium of claim 15, wherein the data regarding the digital certificate of the application includes:
- a digital digest of an application package (APK) of the application; or
- a cryptohash of the APK of the application.

20. The non-transitory computer readable medium of claim 15, wherein the first indication specifying that the client device is trustworthy is a two-bit value, wherein:
- a first bit of the two-bit value indicates that the client device has not been modified or altered; and
- a second bit of the two-bit value indicates that a profile of the client device matches a profile of a device that has previously been verified.

* * * * *